United States Patent
Courtright et al.

(10) Patent No.: US 9,757,825 B2
(45) Date of Patent: Sep. 12, 2017

(54) PICKUP BOX FRONT SILL, FLOOR AND HEADBOARD CONSTRUCTION

(71) Applicant: FORD GLOBAL TECHNOLOGIES, LLC, Dearborn, MI (US)

(72) Inventors: Mark Joseph Courtright, Allen Park, MI (US); Vince Chimento, Plymouth, MI (US); Jack Marchlewski, Saline, MI (US); John Comiez, Novi, MI (US); Jeffrey Alan Firzlaff, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 152 days.

(21) Appl. No.: 14/317,053

(22) Filed: Jun. 27, 2014

(65) Prior Publication Data

US 2015/0375818 A1     Dec. 31, 2015

(51) Int. Cl.
| | |
|---|---|
| *B62D 65/02* | (2006.01) |
| *B62D 29/00* | (2006.01) |
| *B23P 15/00* | (2006.01) |
| *B62D 33/02* | (2006.01) |
| *B62D 25/20* | (2006.01) |
| *B62D 33/027* | (2006.01) |

(52) U.S. Cl.
CPC .......... *B23P 15/00* (2013.01); *B62D 25/2054* (2013.01); *B62D 29/008* (2013.01); *B62D 33/02* (2013.01); *B62D 33/0273* (2013.01)

(58) Field of Classification Search
CPC .. B62D 25/2054; B62D 33/02; B62D 33/023; B21D 13/045

USPC ....... 296/184.1, 183.1, 193.07, 182.1, 183.2, 296/193.04
See application file for complete search history.

(56) References Cited

U.S. PATENT DOCUMENTS

| | | | | |
|---|---|---|---|---|
| 4,631,891 | A * | 12/1986 | Donavich .......... | B62D 25/2054 105/375 |
| 5,188,418 | A * | 2/1993 | Walworth, Jr. .... | B62D 25/2054 296/184.1 |
| 5,575,525 | A | 11/1996 | Walworth, Jr. et al. | |
| 5,730,486 | A | 3/1998 | Jurica | |
| 6,105,231 | A * | 8/2000 | Clare ..................... | B60R 11/06 29/434 |
| 6,126,219 | A * | 10/2000 | Wilkinson ............. | B62D 33/08 296/204 |
| 6,702,365 | B2 * | 3/2004 | Semple ................. | B62D 33/02 296/183.1 |
| 6,814,397 | B2 * | 11/2004 | Henderson ............. | B62D 33/02 296/181.3 |
| 6,986,540 | B2 * | 1/2006 | Augustine .......... | B62D 25/2054 296/181.3 |
| RE39,729 | E * | 7/2007 | Miskech ............ | B62D 33/0273 296/146.8 |

(Continued)

*Primary Examiner* — Glenn Dayoan
*Assistant Examiner* — Sunsurraye Westbrook
(74) *Attorney, Agent, or Firm* — Jason C. Rogers; Brooks Kushman P.C.

(57) ABSTRACT

An aluminum pickup bed is assembled from a stamped headboard, a stamped floorpan, and a roll formed front sill. The headboard, a floorpan flange extending downwardly from the floorpan, and a front wall of the front sill form a three piece sandwich structure. Flow drilled screws are installed into the sandwich structure from the headboard side. The front sill includes a closed front flange and an open rear flange, each of which is welded to the floorpan.

19 Claims, 5 Drawing Sheets

(56) References Cited

U.S. PATENT DOCUMENTS

| | | | |
|---|---|---|---|
| 7,731,271 B2 * | 6/2010 | Shelbo | B21D 13/045 |
| | | | 296/182.1 |
| 2005/0242620 A1 | 11/2005 | McNulty et al. | |
| 2007/0085381 A1 * | 4/2007 | Delaney | B62D 25/04 |
| | | | 296/193.08 |
| 2008/0150322 A1 | 6/2008 | Shelbo et al. | |
| 2009/0184540 A1 * | 7/2009 | Edwards | B62D 33/0273 |
| | | | 296/183.1 |
| 2010/0045072 A1 * | 2/2010 | Yamada | B62D 21/09 |
| | | | 296/204 |

* cited by examiner

PICKUP BOX FRONT SILL, FLOOR AND HEADBOARD CONSTRUCTION

TECHNICAL FIELD

This disclosure relates to the field of pickup truck structures. More particularly, the disclosure pertains to the structure of a pickup bed.

BACKGROUND

Pickup trucks are motor vehicles with a rear open top cargo area often referred to as a bed. Pickup trucks are popular largely because the bed allows them to be utilized in so many different ways, including carrying a variety of types of cargo and towing various types of trailers. Traditionally the majority of body structures on pickup trucks have been formed from steel alloys. Through years of experience, pickup truck designers have learned how to design steel truck body parts that withstand the variety of demanding pickup truck applications. The current regulatory and economic environment have increased the importance of making pickup trucks more fuel efficient as well as functional and durable. One way to reduce the fuel consumption of a vehicle, especially when unloaded, is to reduce vehicle structure weight.

Aluminum alloys typically have a higher strength to weight ratio than steel alloys. Consequently, replacing steel with aluminum offers the potential for weight reduction. However, the elastic modulus of aluminum is generally lower than the elastic modulus of steel. As well, fabrication techniques and methods of joining parts that work well for steel parts may not work well for the same aluminum part. Due to these and other differences, simple material substitution does not necessarily produce an acceptable design.

Aluminum alloys are generally identified by a four-digit number, the first digit of which typically identifies the major alloying element. When describing a series of aluminum alloys based on the major alloying element, the first number may be followed by three x's (upper or lower case) or three zeros. For example, the major alloying element in 6xxx (or 6000) series aluminium alloy is magnesium and silicon, while the major alloying element of 5xxx series is magnesium and for 7xxx series is zinc. Additional numbers represented by the letter 'x' (or zeros) in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

In addition, five basic temper designations may be used for aluminum alloys which are: F—as fabricated, O—annealed, H—strain hardened, T—thermally treated, and W—as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment (or such that cold working would not be recognizable in the material properties).

SUMMARY

An aluminum truck bed includes a floorpan, a front sill, and a headboard. The front sill may include a rear wall, a bottom wall, a front wall, a closed front flange and a rear flange. The front and rear flanges may be welded to the floorpan. A number of holes may be formed into the bottom wall of the front sill to facilitate welding the closed front flange to the floorpan. A floorpan flange may extend downwardly from the floorpan between the headboard and the front wall of the front sill. The headboard, floorpan flange, and front wall of the front sill may be fastened by flow drill screws.

A method of assembling a truck bed includes, obtaining a floorpan, obtaining a front sill, obtaining a headboard, fastening the floorpan to a front flange of the front sill, and installing screws through the headboard, a front flange of the floorpan, and a front wall of the front sill. The screws may be flow drilled screws installed from the headboard side of the sandwich structure. Predrilled holes are not required. The front flange of the front sill may be fastened to the floorpan by inserting a welding tool through holes in a bottom wall of the front sill. The floorpan and the headboard may be stamped from aluminum alloy stock such as 6111. The front sill may be roll formed from aluminum alloy stock such as 6111.

DETAILED DESCRIPTION

Embodiments of the present disclosure are examples and other embodiments may take various and alternative forms. The figures are not necessarily to scale and some features may be exaggerated or minimized to show details of particular components. The specific structural and functional details disclosed are not to be interpreted as limiting, but merely as a representative basis for teaching one skilled in the art how to utilize the present invention. Various features illustrated and described with reference to any one of the figures can be combined with features illustrated in one or more other figures to produce embodiments that are not explicitly illustrated or described. Combinations and modifications of features consistent with the teachings of this disclosure could be used for particular applications or implementations.

Figure 1:
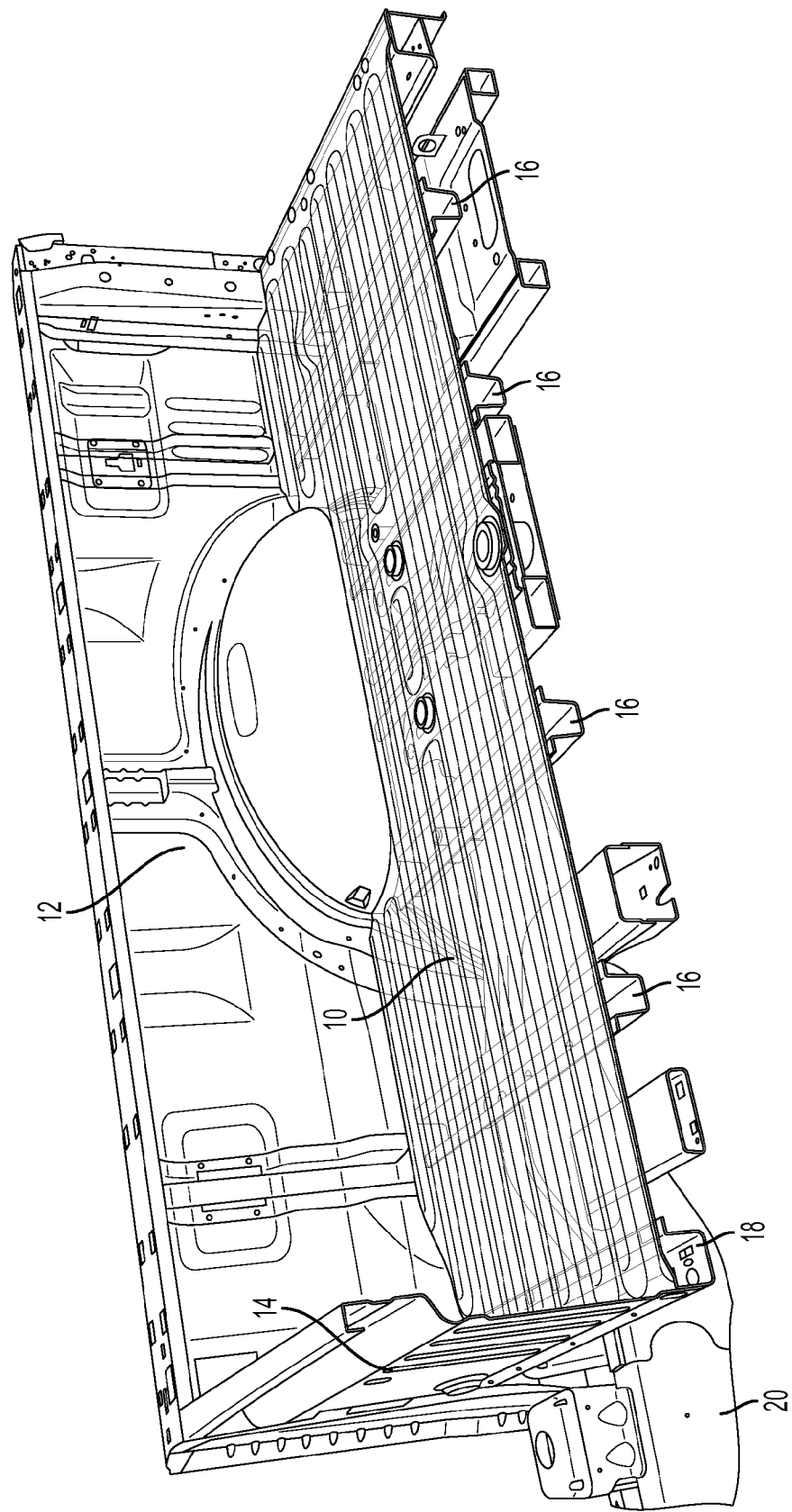
FIG. 1 is a cut-away pictorial view of a pickup truck bed.

FIG. 1 shows a cut-away view of a pickup truck box and frame rail. The box structure includes a floorpan 10, left and right sidewalls 12, and a headboard 14. The floorpan, sidewalls, and headboard may be formed from sheet metal by a stamping process. To add rigidity, a number of cross members 16 may be welded to the floorpan 10. The front most cross member 18 nearest the headboard may be called a sill. The cross members may be formed from sheet metal using a roll forming process. Parts made from a roll forming process have a constant cross sectional shape. The floorpan, headboard, sidewalls, and cross members may be made of an aluminum alloy such as 6111. The box structure is bolted to frame rails 20.

During use, a wide variety of loads may be exerted at various points in the box and in various directions. The box structure is designed to transmit these loads to the frame rails with acceptable levels of deflection and without weakening or loosening any joints or sustaining any permanent deformation. Certain types of loading have been found to occasionally cause failure of weld joints in prior art structural arrangements. In particular, the joint between the front sill, the headboard, and the floorpan must be designed to withstand large vertical forces on the headboard and concentrated vertical forces on the floorpan very near the headboard. These loads may result, for example, when the truck travels over a bumpy road with a pickup camper installed.

Figure 2:
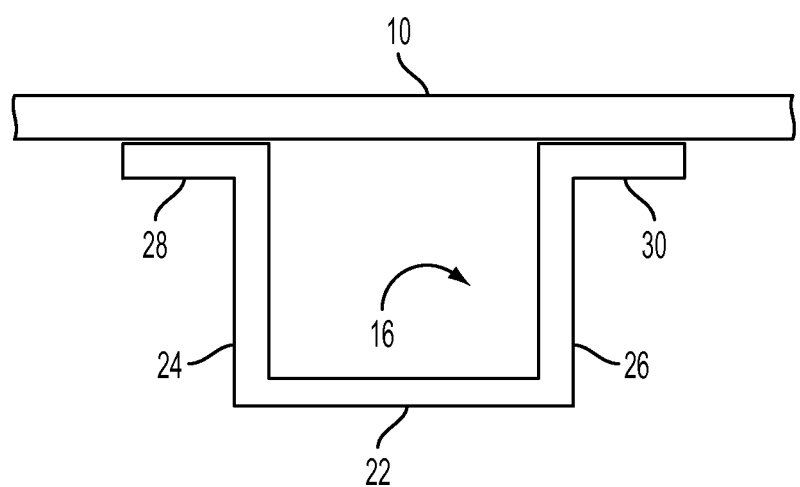
FIG. 2 is a diagrammatic cross sectional view of a cross member of the pickup truck bed of FIG. 1.

FIG. 2 shows a cross section of a cross member 16 attached to floorpan 10. The cross member includes a bottom wall 22, front and rear walls 24 and 26, and front and rear flanges 28 and 30. The cross member 16 may be spot welded to the floorpan at intervals along the front and rear flanges. Flanges which extend away from the remainder of the cross member, like flanges 28 and 30 in FIG. 2, all called open flanges. Open flanges facilitate welding because the bottom surface of the flange is easily accessible. When a vertical load is applied to the floorpan between the frame rails, the bottom wall is placed in tension and the flanges are placed in compression, providing bending stiffness.

If the headboard sill has two open flanges as shown in FIG. 2, then the headboard must be separated from the front wall of the sill in order to provide for welding the front flange to the floorpan. A vertical load on the headboard is then transferred through the floorpan to the sill and then eventually to the frame rails. This loads the floorpan in bending in a region in which the floorpan has limited bending stiffness. Consequently, the deflection may be excessive. The deflection is more likely to be a concern with an aluminum truck bed than a steel truck bed due to the low modulus of elasticity of aluminum alloys. Also, some bending load may be reacted by pulling against the welds on the rear sill flange which may cause these welds to weaken or fail.

Figure 3:
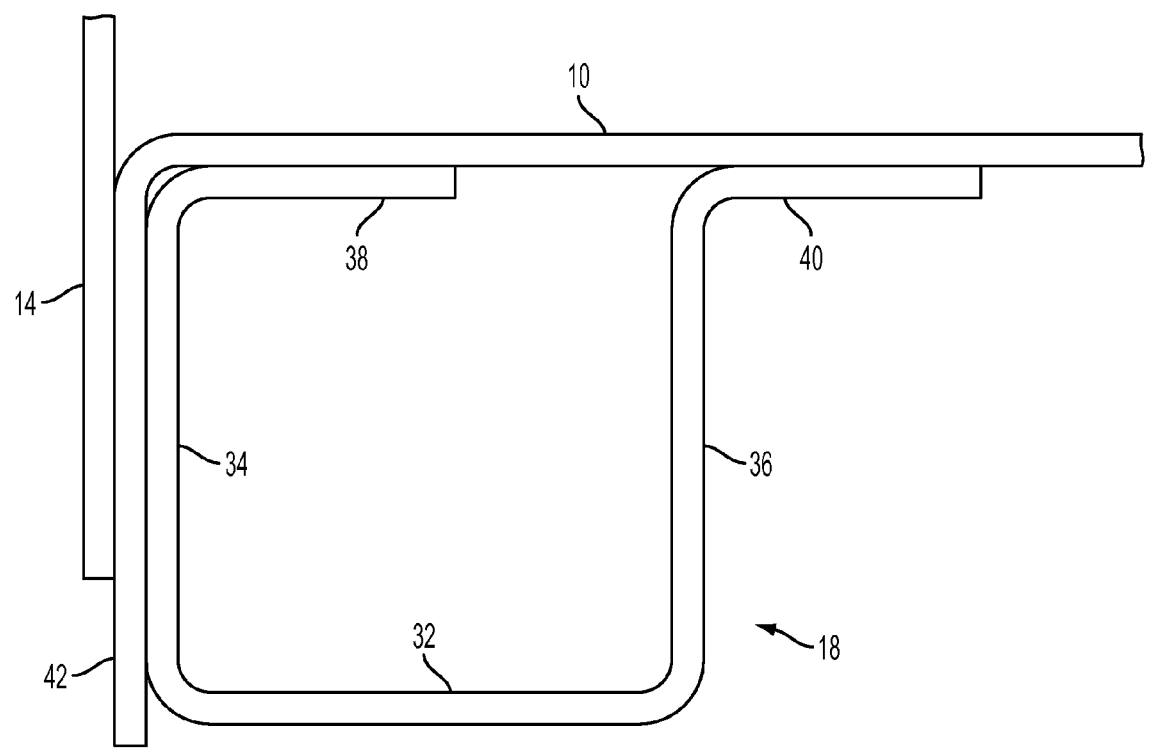
FIG. 3 is a diagrammatic cross sectional view of a front sill of the pickup truck bed of FIG. 1.

FIG. 3 is a cross sectional view of a front sill 18, headboard 14, and floorpan 10. The front sill 18 includes a bottom wall 32, front and rear walls 34 and 36, and front and rear flanges 38 and 40. Front flange 38 is a closed flange, extending rearward from the top edge of front wall 34 in the same direction that bottom wall 32 extends from the bottom edge of front wall 32. Bottom wall 32 has holes at intervals along its length which provide access to welding front flange 38 to the bottom surface of floorpan 10. Rear flange 40 is an open flange permitting welding without special provisions. Floorpan 10 includes a front flange 42 extending downwardly from the front edge. Front flange 42 is sandwiched between headboard 14 and front wall 34 and all three pieces are fastened.

Figure 4:
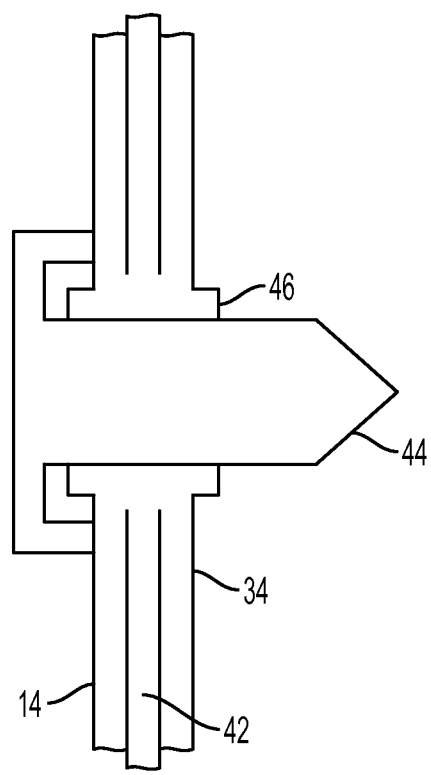
FIG. 4 is a diagrammatic cross sectional view of a flow drilled joint of the pickup truck bed of FIG. 1.

The three thickness joint among headboard 14, front flange 42, and front wall 34 may be joined using flow drilled screws. In the flow drilling process, all three pieces are clamped together while a set of screws are forced through all three thickness of material. An insertion tool rotates each screw while it applies an axial force into the material to be joined. Drilling pilot holes in not necessary. The flow drilling process temporarily melts the sheet metal locally as the screw is forced through. As the metal re-solidifies around the screw, threads are formed in the metal. FIG. 4 shows a cross section through one of the flow drilled screws 44. Note that a slight boss 46 is formed by excess material that flows from the space now occupied by screw 44.

Flow drilling provides a number of advantages over welding for this joint. Flow drilling is suitable for joining more than two pieces in a single joint. Flow drilling is not adversely impacted by the high electrical conductivity of aluminum. Flow drilling can be accomplished without access to both sides of the parts. Since a threaded joint is formed, the screw may be removed and then re-installed or replaced with another screw.

The three thickness joint provides an effective way of transferring vertical loads on the headboard 14 to the front wall 34 of the sill 18. Also, the front flange provides rigidity to floorpan 10 near the front edge and effectively transfers vertical loads to the front wall 34 of sill 18. These loads are transferred primarily via shear forces acting through flow drilled screws 44. Since bending loads are not generated, stress on the welded joint between rear flange 40 and floorpan 10 are minimal. From the front wall of the sill 18, the loads are easily transmitted to frame rails 20 to which the sill is bolted.

Figure 5:
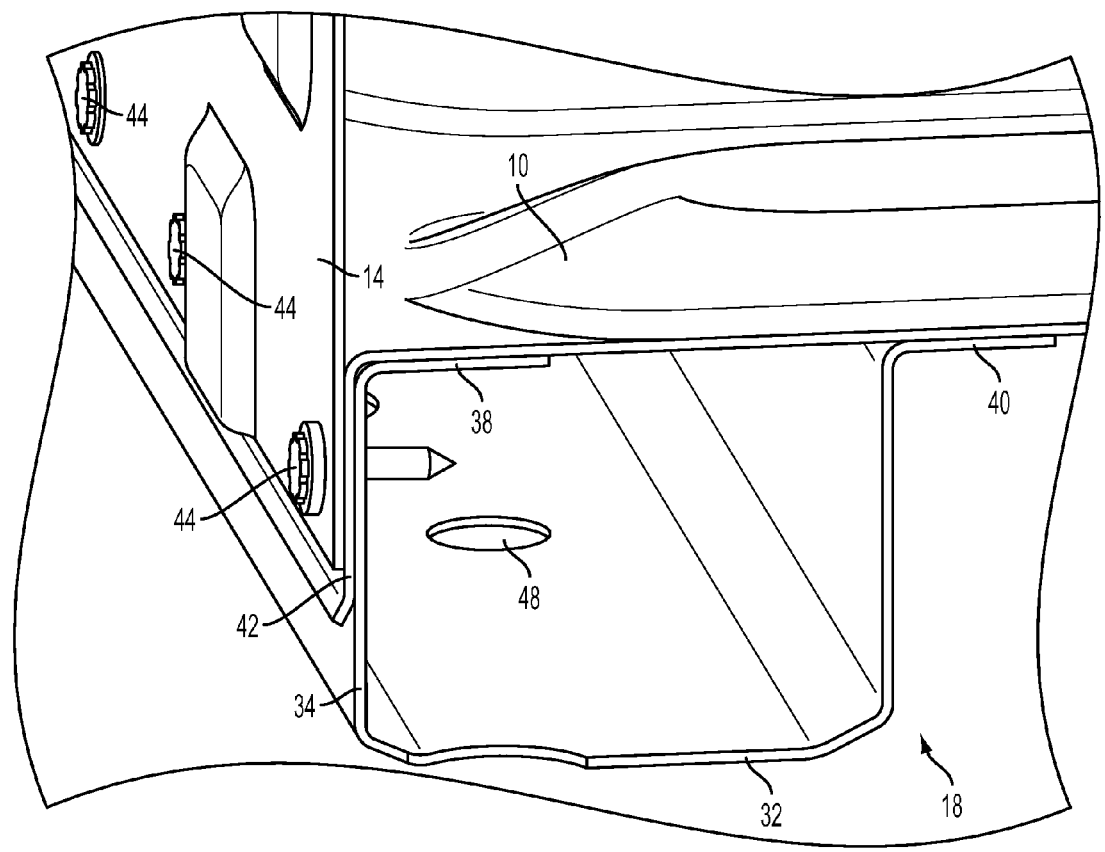
FIG. 5 is a cut-away pictorial view of a portion of the pickup truck bed of FIG. 1.

FIG. 5 shows a cut-away view of the floorpan 10, headboard 14, and front sill 18. A number of flow drilled screws 44 are installed at intervals along the front of the bed assembly. One of the holes 48 in bottom wall of sill 18 to accommodate welding of front flange 38 to floorpan 10 is also visible.

While exemplary embodiments are described above, it is not intended that these embodiments describe all possible forms encompassed by the claims. The words used in the specification are words of description rather than limitation. It is understood that various changes can be made and the features of various embodiments can be combined to form further embodiments of the invention that may not be explicitly described or illustrated. While various embodiments are described as providing advantages or being preferred over other embodiments or prior art implementations, those of ordinary skill in the art should recognize that one or more features or characteristics can be compromised to achieve desired overall system attributes that depend on the specific application and implementation. Embodiments described as less desirable than other embodiments or prior art implementations with respect to one or more characteristics are not outside the scope of the disclosure and can be desirable for particular applications.

What is claimed is:

1. An aluminum truck bed comprising:
    a floorpan;
    a front sill having a rear flange fastened to the floorpan, a rear wall extending from the rear flange, a bottom wall extending from the rear wall, a front wall extending from the bottom wall, and a closed front flange extending from the front wall and fastened to the floorpan; and
    a headboard joined to the front wall of the front sill by flow drill screws.

2. The aluminum truck bed of claim 1 wherein the floorpan has a downward extending floorpan flange sandwiched between the headboard and the front wall of the front sill.

3. The aluminum truck bed of claim 1 wherein the bottom wall of the front sill defines a plurality of holes to provide access for welding the front flange to the floorpan.

4. The aluminum truck bed of claim 1 wherein the rear flange is welded to the floorpan.

5. An aluminum truck bed comprising:
    a headboard;
    a front sill having a front wall, a bottom wall and a front flange extending from the front wall, and a rear wall extending from the bottom wall; and a floorpan welded to the front flange, the floorpan having a floorpan flange extending downwardly from a front edge and sandwiched between and joined to the headboard and the front wall.

6. The aluminum truck bed of claim 5 further comprising a plurality of screws joining the headboard, the floorpan flange, and the front wall of the front sill.

7. The aluminum truck bed of claim 6 wherein the screw joint between the headboard, the floorpan flange, and the front wall is flow drilled.

8. The aluminum truck bed of claim 5 wherein the front sill further comprises:
a rear flange extending from the bottom wall substantially coplanar with the front flange and welded to the floorpan.

9. The aluminum truck bed of claim 8 wherein the front flange is a closed flange and the rear flange is an open flange.

10. The aluminum truck bed of claim 9 wherein the bottom wall defines a plurality of holes to provide access for welding the front flange to the floorpan.

11. The aluminum truck bed of claim 5 wherein the floorpan, headboard, and sill are each made of a 6xxx series aluminum alloy.

12. A method of assembling a truck bed comprising:
obtaining a floorpan having a floorpan flange;
obtaining a front sill having front, bottom, and rear walls and front and rear flanges;
fastening the floorpan to the front flange;
obtaining a headboard; and
installing a plurality of screws through the headboard, the floorpan flange, and the front sill such that the floorpan flange is sandwiched between the headboard and the front wall.

13. The method of claim 12 wherein the plurality of screws are installed from a headboard side.

14. The method of claim 13 wherein the screws are flow drilled screws.

15. The method of claim 14 wherein screws are installed without predrilled holes.

16. The method of claim 12 wherein the bottom wall defines an access hole and fastening the floorpan to the front flange comprises inserting a welding tool through the access hole and welding the floorpan to the front flange.

17. The method of claim 12 wherein obtaining the front sill comprises roll forming aluminum alloy stock to form the front flange, the front wall, the bottom wall, the rear wall, and the rear flange.

18. The method of claim 17 further comprising welding the rear flange to the floorpan.

19. The method of claim 12 wherein obtaining the floorpan and obtaining the headboard each comprise stamping aluminum alloy stock.

* * * * *